United States Patent [19]

Magoto et al.

[11] Patent Number: 5,752,584
[45] Date of Patent: May 19, 1998

[54] AUXILIARY LIFTING FORKS FOR DOUBLE-LENGTH PALLET TRUCKS

[75] Inventors: Daniel C. Magoto, Russia; Gerald R. Metzger, Coldwater, both of Ohio

[73] Assignee: Crown Equipment Corporation, New Bremen, Ohio

[21] Appl. No.: 755,710

[22] Filed: Nov. 25, 1996

Related U.S. Application Data

[63] Continuation of Ser. No. 415,556, Apr. 3, 1995, abandoned.

[51] Int. Cl.$^6$ ........................................... B66F 9/22
[52] U.S. Cl. ..................... 187/234; 187/233; 187/237; 187/231
[58] Field of Search ........................ 187/233, 237, 187/232, 234, 238, 231

[56] References Cited

U.S. PATENT DOCUMENTS

| | | | |
|---|---|---|---|
| 1,407,124 | 2/1922 | Carr | 187/233 |
| 1,432,299 | 10/1922 | Pleines | 187/233 |
| 1,497,085 | 6/1924 | Brandt | 187/233 |
| 2,520,857 | 8/1950 | Schreck | 187/231 |
| 3,265,158 | 8/1966 | Constable | 187/237 X |
| 4,692,084 | 9/1987 | Persson | 187/233 |

FOREIGN PATENT DOCUMENTS

| | | | |
|---|---|---|---|
| 1263683 | 5/1961 | France | 187/231 |
| 2574773 | 6/1986 | France | 187/237 X |
| 726707 | 7/1972 | Italy | 187/231 |
| WO9308078 | 4/1993 | WIPO | |

OTHER PUBLICATIONS

Clark Equipment Company, "Gas and Electric Fork Trucks and Industrial Towing Tractors," Dec. 19, 1949, p. 25.

*Primary Examiner*—Joseph E. Valenza
*Assistant Examiner*—Khoi H. Tran
*Attorney, Agent, or Firm*—E. Paul Forgrave

[57] ABSTRACT

An improved pallet truck, having an extended length pair of forks capable of supporting multiple, side-by-side, pallets which may be raised well above the floor to assist an operator in an order selection operation, includes a first fork lifting mechanism connected to one end of a pair of primary forks. A pair of load wheels are mounted on levers at a other end of the forks and are mechanically connected to the first fork lifting mechanism which causes the other end of the primary forks to be raised from a lower level to an upper level simultaneously with the raising of the first end thereby to maintain the primary forks level while lifting the maximum capacity of the truck. A pair of secondary forks are mounted above the primary forks and are movable from a nested position with respect to the first forks to a raised position by a second fork lifting mechanism carried by the primary forks. The ends of the secondary forks are supported by a pair of hydraulic cylinders attached between the secondary forks and the primary forks, thus providing support and rigidity to the secondary forks while they are in a raised position.

11 Claims, 6 Drawing Sheets

AUXILIARY LIFTING FORKS FOR DOUBLE-LENGTH PALLET TRUCKS

This is a continuation of co-pending application Ser. No. 08/415,556, filed Apr. 3, 1995 now abandoned.

BACKGROUND OF THE INVENTION

This invention relates to an improved pallet truck having an extended length pair of forks capable of supporting multiple, side-by-side, pallets which may be raised well above the floor to assist an operator in an order selection operation.

In a typical order selection or stock picking operation using a pallet truck, an operator often starts with an empty pallet carried on the forks of a pallet truck onto which a load is accumulated one item or carton at a time as he or she moves through the aisles of the warehouse until a completed order has been assembled. The operator moves the truck either by riding or walking to the desired location, picks the desired item from a rack and places it on the pallet. A truck with extended length forks that can carry two or more pallets side by side on its forks improves efficiency and logistics; however, such trucks generally have forks that can raise only approximately six to nine inches above the floor. One such pallet truck is a Series PE Rider Pallet Truck manufactured by Crown Equipment Corporation, the assignee of the present invention. The height of the forks may be adjusted from a lowermost position, where the bottoms of the pallets are in contact with the floor and the forks are clear of the underneath surface of the pallets, to a raised position, where the pallets have been lifted clear of contact with the floor and are free to move about a warehouse.

Order selecting trucks provided with a high lift mechanism, ones that raise the pallet eighteen inches or more above the floor, can assist the operator in loading a pallet quickly and conveniently. Existing trucks of this type, however, only provide a fork length sufficient to handle a single pallet. It would be desirable in some circumstances to provide an order picking truck where multiple pallets, at least two, can be placed in excess of twelve inches, and preferably in excess of eighteen inches, above the floor, while the load on the pallets is fully supported until the order selecting operation is complete and the pallets lowered to the floor.

SUMMARY OF THE INVENTION

This invention relates to an improved pallet truck having a pair of extended length forks capable of supporting multiple side-by-side pallets well above the floor to assist an operator in an order selection operation.

The present invention includes a pallet truck provided with a pair of forks having a length from one end to another sufficient to hold multiple industry standard pallets in a side-by-side relationship. A fork lifting mechanism is carried by the truck and positions the forks from a lower position, where the pallets carried thereby are in contact with the floor, to an upper position, in excess of twelve inches above the floor. A fork support mechanism supports the other end of said forks as the forks are raised and lowered by the fork lifting mechanism.

More specifically, in a preferred embodiment of the invention, two sets of forks are employed. The first set of forks is conventional, that is, they are similar to those used in a conventional pallet truck, being capable of raising a pallet from the floor to a position clear of the floor with the outer ends of these forks supported by load wheels attached to levers which maintain the forks parallel with the floor. A pair of upper or secondary forks are placed over, preferably in nesting relation to, the first set of forks. The fork lifting mechanism includes a first fork lifting mechanism, which is supported on the body of the pallet truck for raising the lower forks, and a second fork lifting mechanism, which is supported on and carried by the first or primary forks for raising the secondary forks from their nested position to a convenient height for the operator. A support mechanism for the upper forks is attached between those forks and the ends of the lower forks to support the upper forks while they are in a raised position.

When the upper forks are lowered into nesting relation with the lower forks, the truck functions similarly to a conventional pallet truck in terms of loading and unloading pallets. When the extended length secondary forks are raised, their ends are supported by hydraulic cylinders which provide rigidity and support, thus minimizing bending and movement of the fork ends. A hydraulic system insures that the pallets remain level, even during unequal loading since the stabilizing cylinders are-isolated after lift.

In operation, an operator activates a Raise button on the truck which activates a solenoid to power a motor-hydraulic pump package. The pump and associated manifold supplies high pressure hydraulic fluid or oil to the rest of the system. An adjustable relief valve controls over-pressure and limits the maximum load lifting capability. A check valve prevents reverse hydraulic fluid flow. The lifting of the lower forks is done by a first fork lifting mechanism, a conventional low lift pallet truck mechanism using a hydraulic cylinder and four bar linkage to raise a pair of primary or lower forks and to adjust the load wheel support arms. In this lifting range, the maximum capacity load of the pallet truck can be lifted.

Once the lower forks are fully raised, at approximately six to nine inches of lift, an electrical switch is activated by the first or lower fork lift mechanism and hydraulic valves are actuated to isolate the lower fork lift cylinder from the hydraulic circuit. The hydraulic fluid is then diverted through an adjustable pressure reducing valve which limits the load which can be lifted above the lower forks. The hydraulic fluid is supplied simultaneously to a hydraulic cylinder in the second fork lifting mechanism and a flow divider block which supplies equal volume to each fork tip support or stabilizing cylinder. Once the desired height is reached, the operator disengages the Raise button and the hydraulic valves and components isolate each of the cylinders to provide a rigid fork platform.

To lower, the operator activates a Lower button on the truck which in turn activates the lowering solenoid and hydraulic valves to allow hydraulic fluid to return to the reservoir from the mast and tip cylinders.

One benefit of this invention is that it allows the operator to position the pallet higher from the floor. Starting with an empty pallet, the operator may raise the forks to their maximum height with the pallet at least twelve, and preferably eighteen to twenty-four inches off the floor, and as stock is added to the pallets, the forks may be lowered to maintain a desired stacking height while all forks are rigidly supported.

Once the second fork lifting mechanism is fully lowered, it engages an electrical switch to deactivate hydraulic valves and allow hydraulic fluid from the first fork hydraulic cylinder to return to the reservoir and complete the lowering cycle.

Accordingly, it is an object of this invention to provide an improved pallet truck having a pair of extended length forks capable of supporting multiple side-by-side pallets well above the floor to assist an operator in an order selection operation.

It is another object of this invention to provide a method of order selecting using pallet truck provided with forks of extended length capable of supporting multiple side-by-side pallets, the method including the steps of placing one or more pallets on the forks, raising one end of the forks in excess of twelve inches above the floor, supporting the other end of the forks to provide a stable platform while items are accumulated on the pallets, lowering the forks to place the pallets in contact with the floor, and backing the pallet truck from under the loaded pallets.

It is a further object of this invention to provide a pallet truck operating on the floor of a warehouse for order selecting, the truck comprising a truck body, a pair of forks having a length from one end to another sufficient to hold multiple, side-by-side industry standard pallets, a fork lifting mechanism carried by the truck body and supporting one end of the forks for positioning the forks from a lower position, less than approximately four inches above the floor, to an upper position, in excess of twelve inches above the floor, and a fork support mechanism for providing support to the other end of the forks as the forks are positioned by the fork lifting mechanism.

It is a still further object of this invention to provide a pallet truck comprising a truck body, a first fork lifting mechanism carried by the truck body, a pair of primary forks having a first end attached to the fork lifting mechanism, load wheels positioned at a second end of the primary forks, a load wheel lifting mechanism responsive to the first fork lifting mechanism for causing the second end of the primary forks to be raised from a lower level to an upper level simultaneously with the raising of the first end thereby to maintain the primary forks level, a pair of secondary forks mounted above the primary forks, a second fork lifting mechanism carried by the primary forks for raising a first end of the secondary forks from a lower position to a raised position, and a support mechanism attached to the secondary forks to support the secondary forks while in a raised position.

Other objects and advantages of the invention will be apparent from the following description, the accompanying drawings and the appended claims.

DESCRIPTION OF THE PREFERRED EMBODIMENT

Figure 1:
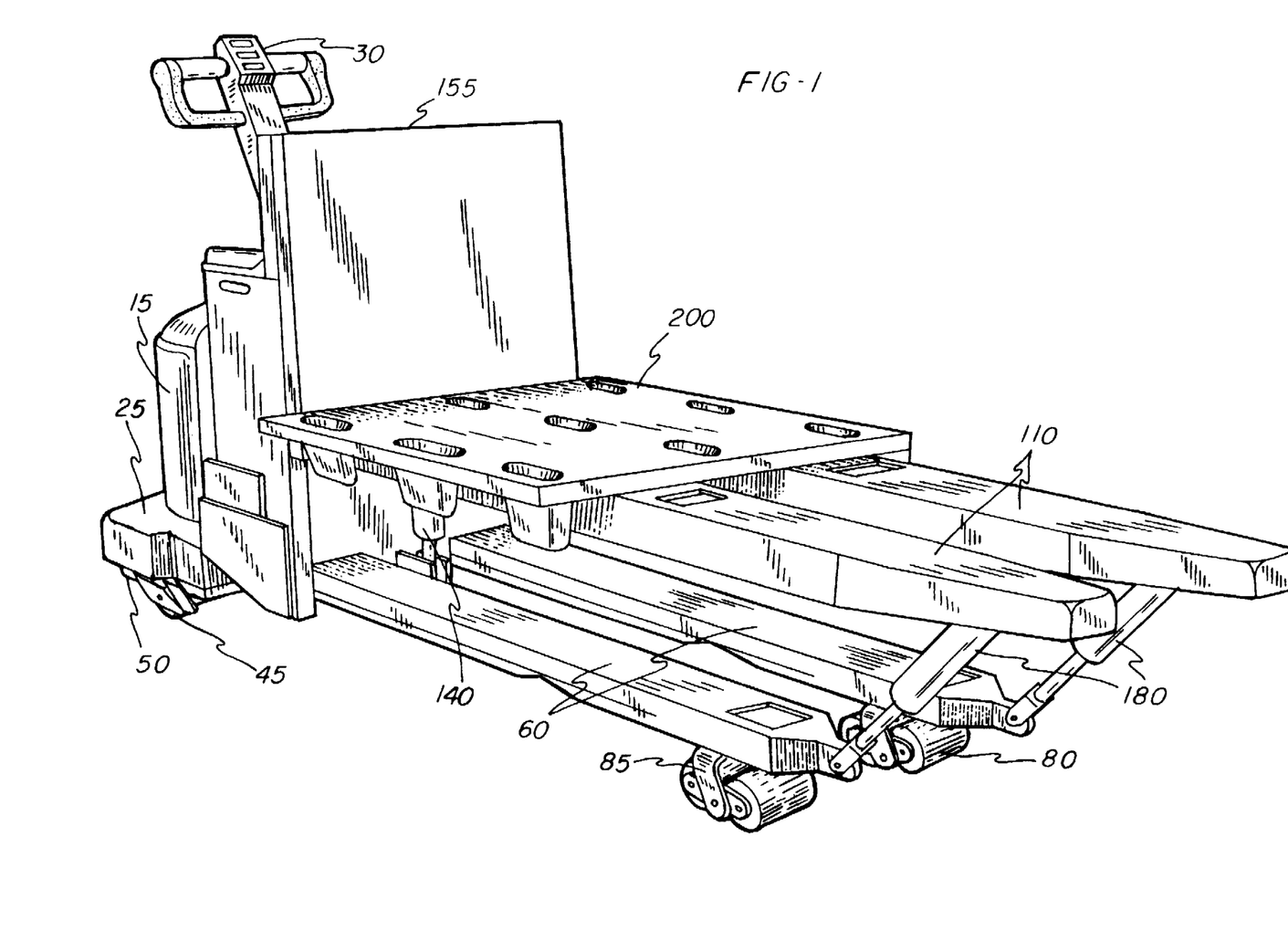
FIG. 1 is a perspective view of a rider pallet truck provided with stabilized extended secondary forks constructed according to the present invention.
Figure 2:
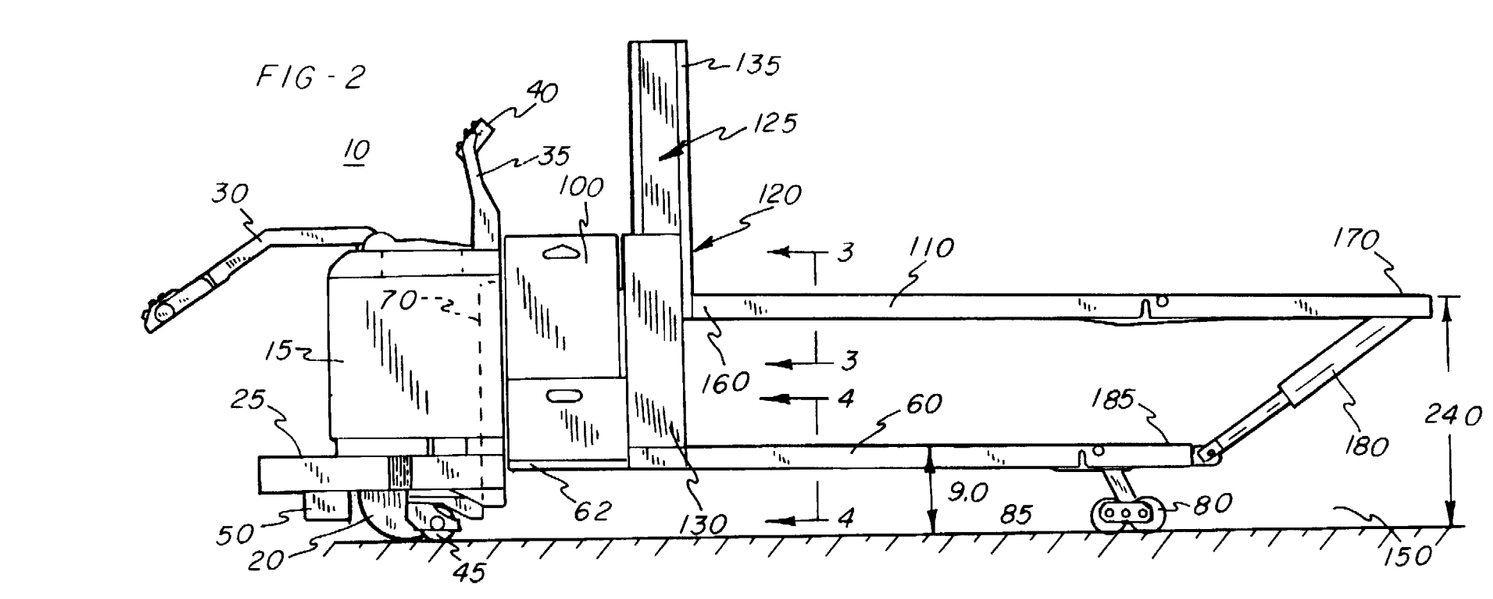
FIG. 2 is a side elevational view of the rider pallet truck shown in FIG. 1.

Referring now to the drawings which illustrate a preferred embodiment of this invention, and particularly to FIGS. 1 and 2, an extended length rider pallet truck 10 includes a power unit 15, which includes a motor (not shown) providing power to a drive wheel 20, a platform 25 on which an operator may ride, a control handle 30 for controlling the direction and speed of the truck, an operator grab bar 35 with function controls 40. A pair of castors 45 are placed outside the drive wheel. The truck is normally driven power unit first, or to the left as shown in FIG. 2, although the truck may also be moved in the reverse direction when desired. A bumper or debris guard 50 is placed under the truck to protect the drive wheel 20 and castors 45 from damage.

A pair of primary or lower forks 60 are supported on a first fork lifting mechanism 70 which can raise the lower forks 60 from their lowermost position to an upper level approximately nine inches above the floor. The first fork lifting mechanism is a basic four-bar arrangement with a primary hydraulic cylinder 75 (FIG. 5) providing the lifting force. A typical pallet truck of this type can lift 6000 to 8000 pounds.

A load wheel 80 is placed at the outer end of each lower fork 60. The load wheel lifting mechanism 85 includes arms 87 connected to linkage rods 90 which cause the wheels to lower and support the lower forks as they are lifted. A battery 100 is carried at the heel end 62 of the lower forks and will be raised and lowered with the forks 60.

A pair of secondary or upper forks 110 are positioned above the lower forks 60 and are carried by a second fork lifting mechanism 120 mounted on the lower forks 60. The second lifting mechanism includes a mast structure 125 formed from stationary channel members 130 and vertically movable channel members 135 which are guided by rollers (not shown). A secondary hydraulic lift cylinder 140 (shown in FIG. 8) provides lifting power sufficient to raise the upper forks 110 up to approximately twenty-four inches above the floor 150. A vertical wall 155 is placed between the heel end 160 of the upper forks 110 and the lifting mechanism.

Ends 170 of the upper forks 10 are stabilized by a second fork supporting mechanism 180, including hydraulic cylinders, that are connected between the ends of the upper forks and the ends 185 of the lower forks 60. It is to be understood that the stabilizing hydraulic cylinders 180 do not necessarily have to be connected to the ends of the upper forks, but it is preferred that they be connected to the ends of the lower forks since this provides a convenient mounting point.

The upper forks 110 are shown as being double length, that is, they can support a pair of typical industry standard 40 by 48 inch pallets, but it is to be understood that the forks may be made longer, if desired. In some applications, the pallet length need only be as long as the narrow side of one pallet plus 75% of a second pallet. Thus, it is only required that the forks be of sufficient length to support at least two pallets. While only a single pallet 200 is shown on the upper forks 110 in FIG. 1, it is to be understood that multiple, side-by-side pallets may be carried on the forks. As shown, the pallet 200 is a block style pallet that includes a plurality of blocks or legs 202 that descend from an upper platform 204. The spacing between blocks 202 is standard and permits the forks of a pallet truck to pass freely therebetween.

Figure 3:
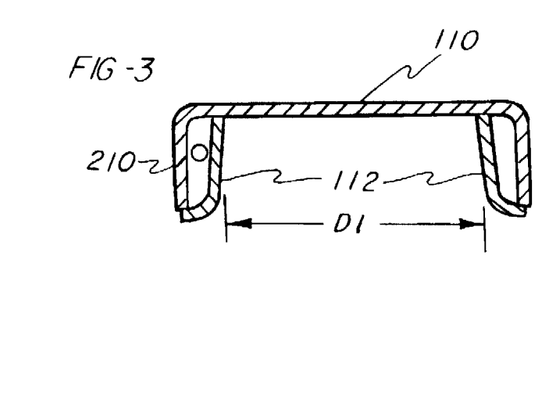
FIG. 3 is a cross-sectional view of the upper or secondary forks, taken along line 3—3 in FIG. 2.
Figure 4:
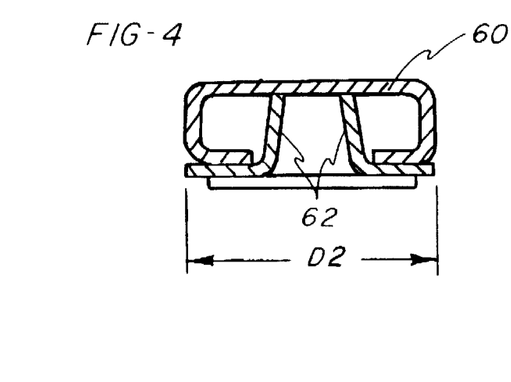
FIG. 4 is a cross-sectional view of the lower or primary forks, taken along line 4—4 in FIG. 2.

As shown in the cross sectional views of FIGS. 3 and 4, the upper fork 110 is a C-shaped member provided with a reinforcing strip 112. A hydraulic line 210 from the power unit 15 to the stabilizing cylinders 180 may be carried in the space formed between the strip 112 and the fork 110. The lower fork 60 is also provided with a reinforcing strip 62. The inside dimension D1 of the upper fork is greater than the outside dimension D2 of the lower fork 60, thus allowing the two fork sections to nest.

Figure 6:
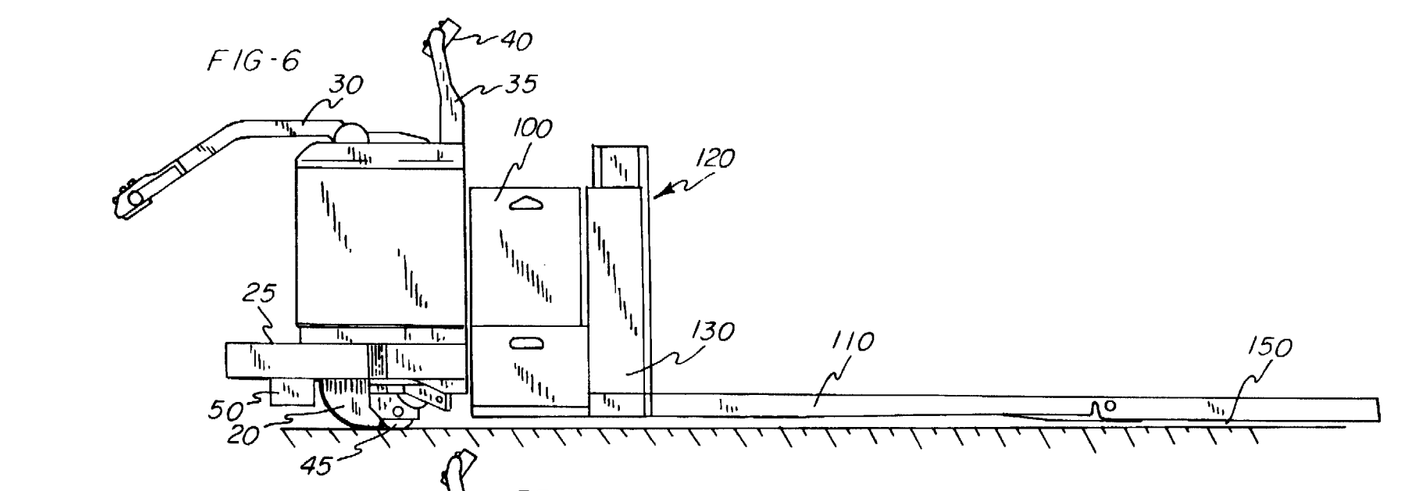
FIG. 6 is a side elevational view of the truck constructed according to the present invention showing the upper and lower forks nested and in their lowermost position.

In operation, the forks 60 and 110 are initially in a lowered position, as shown in FIG. 6. In this position, the forks may be placed under a pallet or a pallet previously on the forks may be deposited. The height of the upper surface of the upper forks is below the lower surface of a pallet in this configuration.

Figure 5:
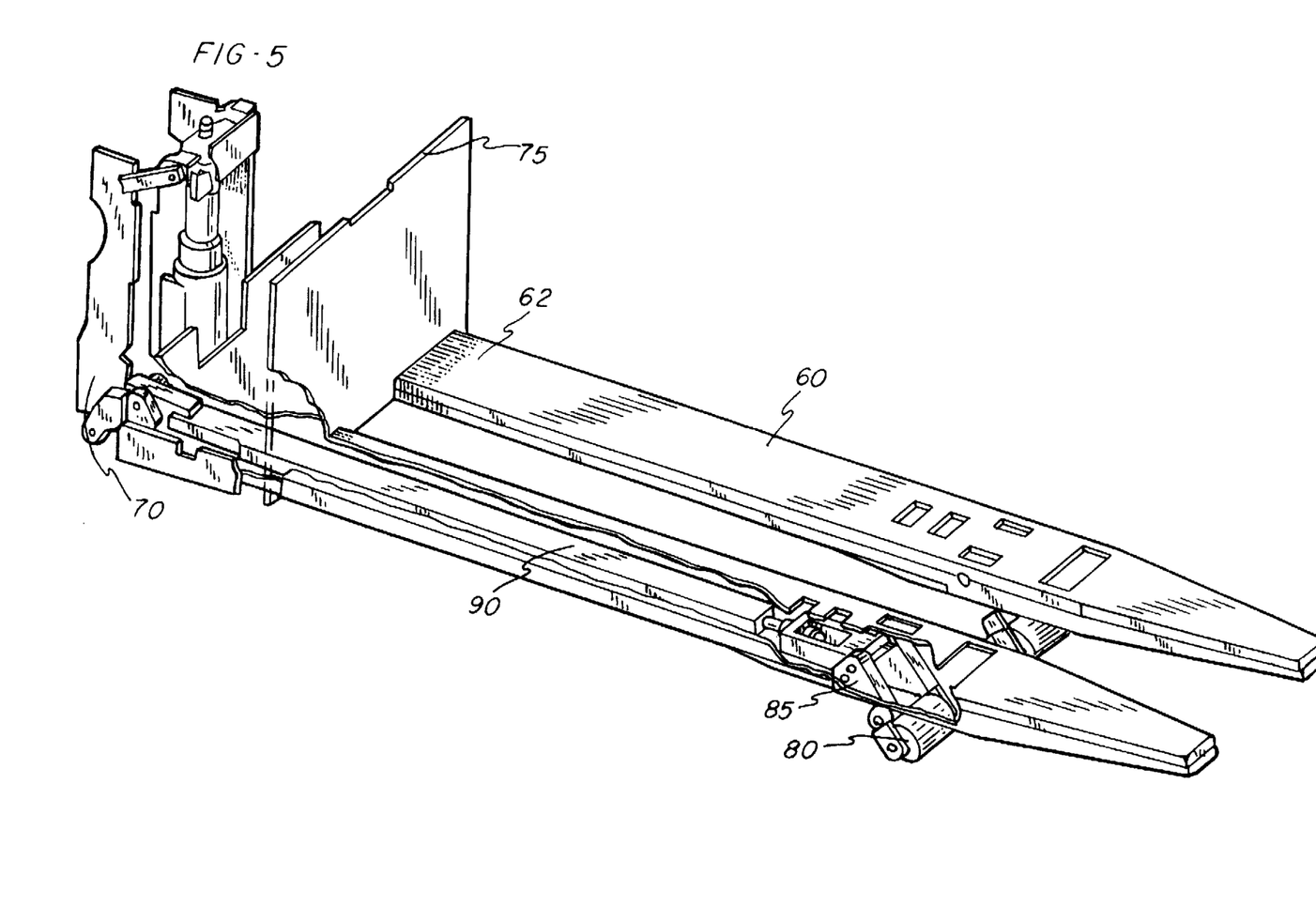
FIG. 5 is a perspective view showing the lift mechanism for the lower forks, and the linkage rod controlling the position of the load wheels.
Figure 7:
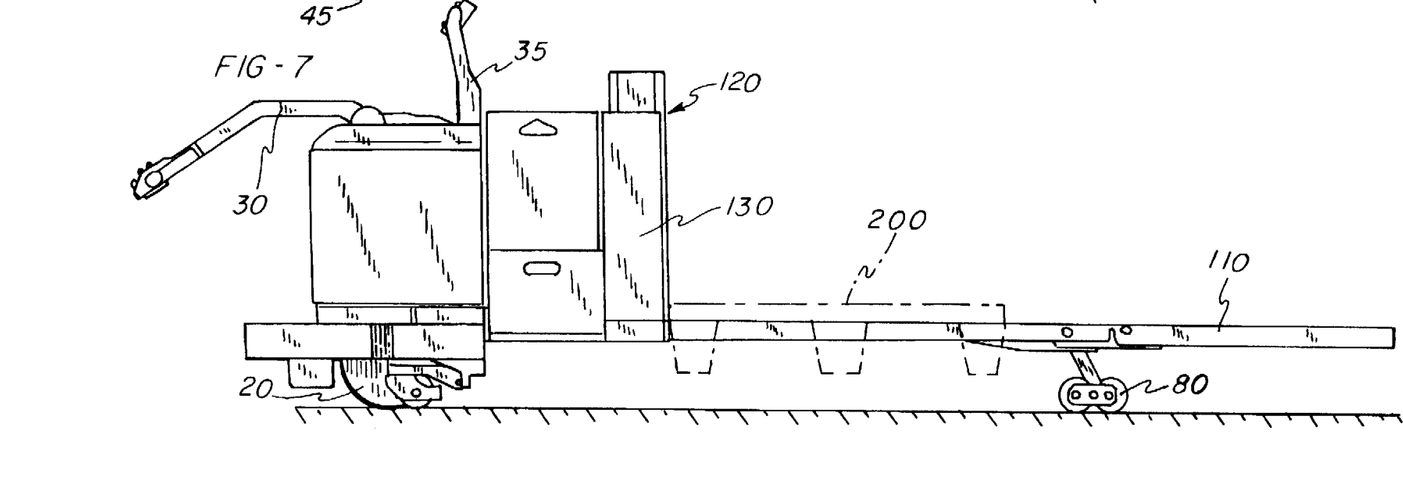
FIG. 7 is a side elevational view of the truck constructed according to the present invention showing the upper and lower forks nested and in a raised position, sufficient to raise a pallet above the floor.

In FIG. 7, the forks are raised to a first position. This represent the upper level position of the forks of a conventional pallet truck, such as the Crown PE Series Rider Pallet Truck, when a pallet 200 is placed on the forks. The load wheel 80 is lowered by action of the linkage rod 90, which is connected to the first lifting mechanism 70 (FIG. 5). In this position, the upper surface of forks 110 is about nine inches above the floor, and thus the bottom of pallets carried on the forks will be clear of the floor, thus enabling the pallets to be moved. In this position, the load wheels are extended and support the outer ends of the forks, as is conventional with a PE Series Rider Pallet Truck.

When the upper forks 110 are raised to their maximum height, as shown in FIG. 1, the upper surface of the forks will be approximately twenty-four inches or more above the floor. In this position, the operator may conveniently load the pallet from stock from racks adjacent the truck. The upper fork may be placed at any convenient height, from nine to twenty-four inches, depending on the desire of the operator.

Figure 8:
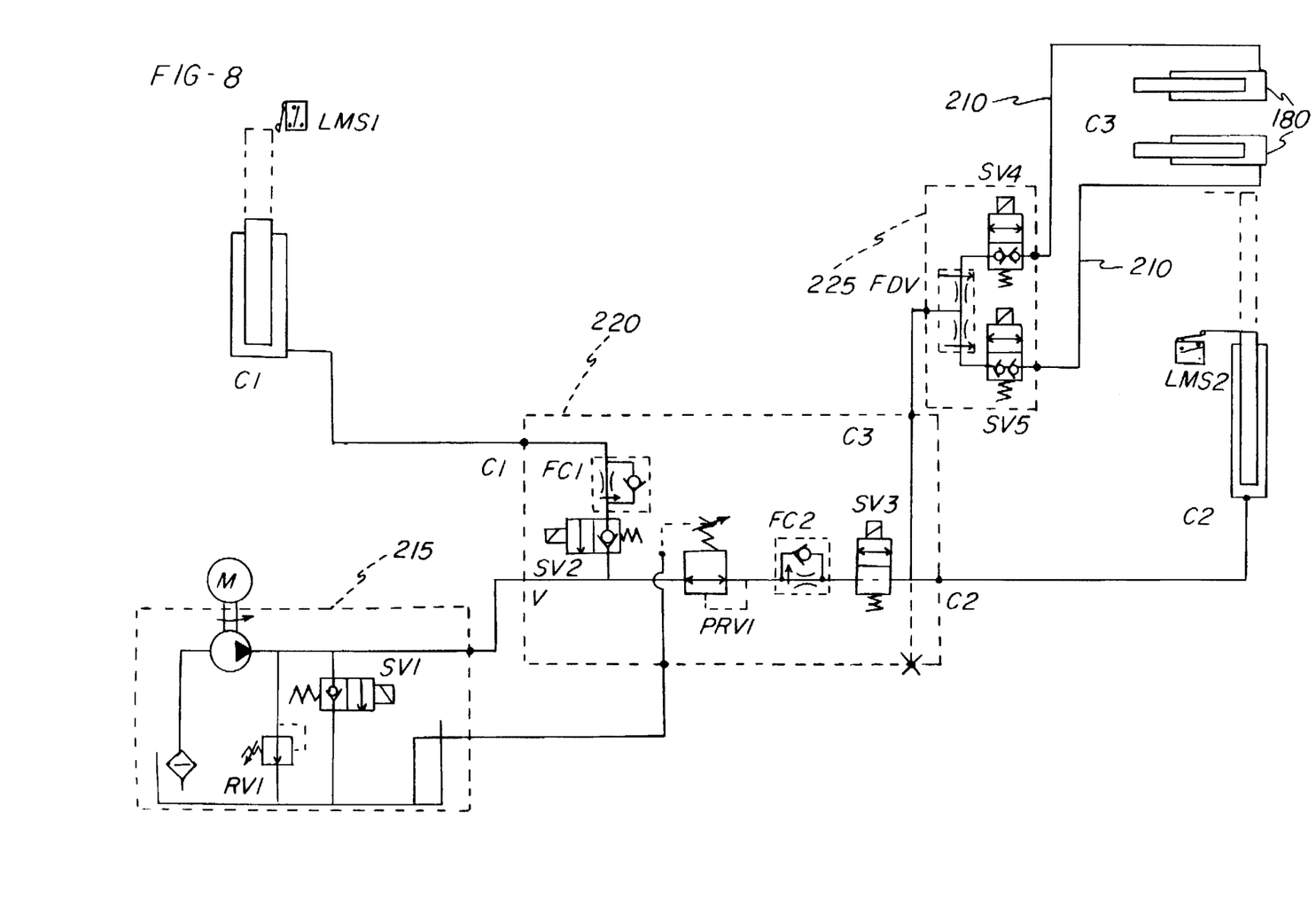
FIG. 8 is a schematic of the hydraulic system for the present invention.

A hydraulic schematic drawing of the improved pallet truck is shown in FIG. 8. This schematic is similar to the hydraulic schematic used in a conventional PE Series Pallet Truck but includes two additional features, namely a secondary lift cylinder 140 and the two stabilizing or fork tip cylinders 180. Hydraulic fluid is provided to the system from power unit 215, which includes a pump-motor unit, to a manifold 220. The secondary lift cylinder 140 will only be provided with hydraulic fluid after the primary lift cylinder 75 has reached its height limit, as indicated by the dotted lines showing the upward movement of the primary lift cylinder engaging the limit switch LMS1. During downward movement, hydraulic pressure will be released from the primary lift cylinder only after the secondary lift cylinder has reached its lower travel limit, as indicated by the full line depiction, and limit switch LMS2 is actuated. Hydraulic device 225, including flow divider valve FDV and valves SV4 and SV5, insures that both stabilizing cylinders 180 receive the same hydraulic flow.

Figure 9:
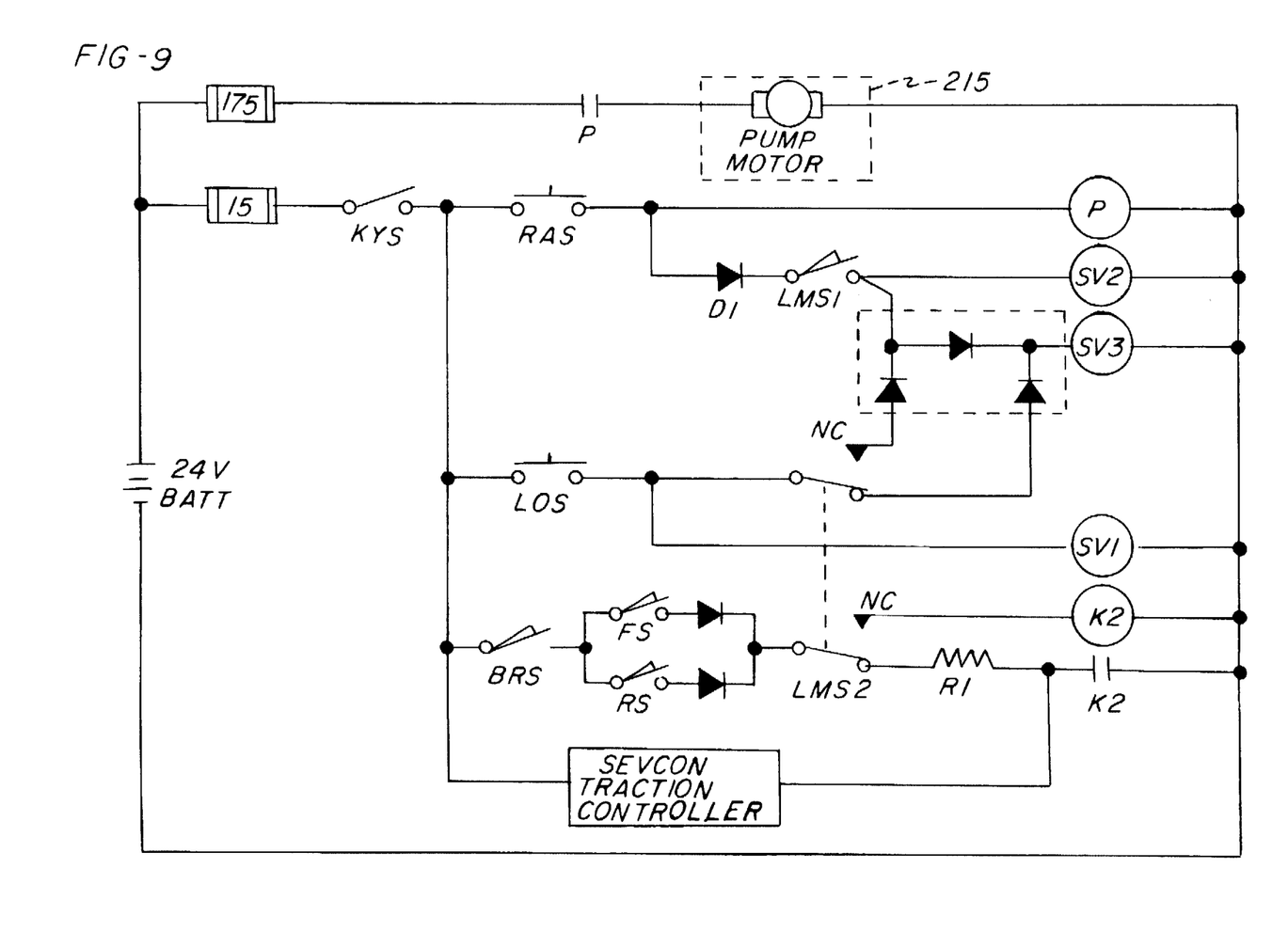
FIG. 9 is an electrical schematic diagram of the electrical system for the present invention.

The electrical schematic diagram of the truck is shown in FIG. 9. Power to the circuit is provided by the battery 100 through fuses F1 and F2. When the operator closes the key switch KYS, battery power is made available to the fork raise switch RAS, the fork lower switch LOS and the brake switch BRS. Forward travel is controlled by forward travel switch FS and reverse travel is controlled by reverse travel switch RS. Switches RAS and LOS are available on the control handle 30 and controls 40 on operator grab bar 35, the brake switch BRS is controlled by the vertical position of the control handle 30, and the forward and reverse switches are controlled by twist grips on the control handle.

This electrical configuration is conventional on a Series PE Rider Pallet Truck. In addition, limit switch LMS1 is fully closed when the lower or primary forks 60 are in their fully raised position, and limit switch LMS2 is shown with the upper or secondary forks 10 in their home, or lowered or nested, position.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A pallet truck comprising
a truck body,
first fork lifting mechanism carried by said truck body,
a pair of primary forks having a first end attached to said fork lifting mechanism,
load wheels positioned to support a second end of said primary forks,
a load wheel lifting mechanism responsive to the first fork lifting mechanism for causing said second end of said primary forks to be raised from a lower level to an upper level simultaneously with the raising of said first end thereby to maintain said primary forks level,
a pair of secondary forks, mounted above said primary forks,
a second fork lifting mechanism carried by said primary forks for raising a first end of said secondary forks from a lower position to a raised position, and
a support mechanism attached to said secondary forks for supporting said secondary forks while in a raised position, said support mechanism includes a support hydraulic cylinder placed between each secondary fork and its corresponding primary fork, and wherein said second lifting mechanism includes a hydraulic lifting cylinder said pallet truck further including a hydraulic circuit for supplying hydraulic pressure to said hydraulic lifting cylinder and said support hydraulic cylinders whereby said secondary forks are supported from their lower position to their fully raised position.

2. The pallet truck of claim 1 wherein said support hydraulic cylinders are connected between the ends of said primary forks and the ends of said secondary forks.

3. The pallet truck of claim 1 wherein said secondary forks have a length equal to or greater than that needed to support at least two industry standard pallets.

4. The pallet truck of claim 1 wherein said secondary forks are mounted directly above said primary forks and are configured to nest with said primary forks when in their lower position.

5. A pallet truck comprising
a truck body,
a first fork lifting mechanism carried by said truck body,
a pair of primary forks having a first end attached to said fork lifting mechanism,
load wheels positioned to support a second end of said primary forks,
a load wheel lifting mechanism responsive to the first fork lifting mechanism for causing said second end of said primary forks to be raised from a lower level to an upper level simultaneously with the raising of said first end thereby to maintain said primary forks level,
a pair of extended length secondary forks mounted above said primary forks, said secondary forks having a first end and a second end;

a second fork lifting mechanism for raising said first end of said secondary forks from a lower position to a raised position;

a support mechanism positioned for supporting said second end of said secondary forks, said support mechanism including a support hydraulic cylinder placed between each secondary fork and its corresponding primary fork, and a hydraulic circuit for supplying hydraulic pressure to said support hydraulic cylinders.

6. The pallet truck of claim 5 wherein said second fork lifting mechanism is carried by said primary forks.

7. The pallet truck of claim 5 wherein said second fork lifting mechanism includes a hydraulic lifting cylinder.

8. The pallet truck of claim 5 wherein said secondary forks have a length equal to or greater than that needed to support at least two industry standard pallets.

9. The pallet truck of claim 5 wherein the length of said pair of secondary forks is at least approximately 72 inches.

10. The pallet truck of claim 5 wherein said support mechanism is attached to said secondary forks at or near the end thereof.

11. The pallet truck of claim 5 wherein said secondary forks are mounted directly above said primary forks and are configured to nest with said primary forks when in their lower position.

* * * * *

UNITED STATES PATENT AND TRADEMARK OFFICE
CERTIFICATE OF CORRECTION

PATENT NO. : 5,752,584
DATED : May 19, 1998
INVENTOR(S) : Magoto et al.

It is certified that error appears in the above-indentified patent and that said Letters Patent is hereby corrected as shown below:

Col. 6, Line 36, "cylinder said pallet" should read
--cylinder, said pallet--

Signed and Sealed this

Twenty-second Day of September, 1998

Attest:

BRUCE LEHMAN

*Attesting Officer*    *Commissioner of Patents and Trademarks*